(12) United States Patent
Sloan

(10) Patent No.: US 9,658,351 B2
(45) Date of Patent: May 23, 2017

(54) NULL SPACE PROJECTION FOR SOURCELESS GAIN STABILIZATION IN DOWNHOLE GAMMA RAY SPECTROSCOPY

(71) Applicant: Schlumberger Technology Corporation, Sugar Land, TX (US)

(72) Inventor: William Robert Sloan, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 915 days.

(21) Appl. No.: 13/645,733

(22) Filed: Oct. 5, 2012

(65) Prior Publication Data

US 2014/0100785 A1 Apr. 10, 2014

(51) Int. Cl.
*G01T 7/00* (2006.01)

(52) U.S. Cl.
CPC .................... *G01T 7/005* (2013.01)

(58) Field of Classification Search
CPC ..................................... G01T 7/005
See application file for complete search history.

(56) References Cited

U.S. PATENT DOCUMENTS

| | | |
|---|---|---|
| 5,023,449 A | 6/1991 | Holenka et al. |
| 5,489,779 A | 2/1996 | Pemper et al. |
| 7,180,055 B1 * | 2/2007 | Kallenbach ............. G01T 7/005 250/252.1 |
| 2005/0267695 A1 * | 12/2005 | German .................... G01N 3/30 702/41 |
| 2006/0065824 A1 * | 3/2006 | Mickael ............. E21B 47/0005 250/252.1 |
| 2011/0031405 A1 | 2/2011 | Kulik et al. |

FOREIGN PATENT DOCUMENTS

RU 2253135 C2 5/2005

OTHER PUBLICATIONS

International Search Report and the Written Opinion for International Application No. PCT/US2013/063439 dated Feb. 13, 2014.

\* cited by examiner

*Primary Examiner* — Phuong Huynh
(74) *Attorney, Agent, or Firm* — Michael Dae

(57) ABSTRACT

A method for gain control of a radiation detector includes measuring standard gamma ray spectra for known concentrations of selected radioactive materials found in earth formations. A standards matrix is calculated from the standard gamma ray spectra. A singular value decomposition is computed from a matrix related to measurements of gamma ray spectra, of formations and the standards matrix. A radiation, detector gain is computed from a minimum ratio of null space with respect to data value space of a subsurface formation measurement related matrix and the standards matrix. Gain of the radiation detector is adjusted based on the computed radiation detector gain.

20 Claims, 7 Drawing Sheets

NULL SPACE PROJECTION FOR SOURCELESS GAIN STABILIZATION IN DOWNHOLE GAMMA RAY SPECTROSCOPY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of naturally emitted gamma ray spectroscopy of subsurface formations from within a wellbore. More particularly, the invention relates to techniques for gain stabilization of scintillation-type radiation detectors used for detecting gamma radiation and characterizing its energy without the need for a radioactive reference source to he used in connection with the scintillation-type radiation detector.

Measurement of geological formation content of thorium, uranium, and potassium provides valuable data for analysis of the geophysical character of underground formations. This information is of interest in the oil and gas exploration industry. To measure the concentration of these elements a well logging instrument containing a gamma ray spectrometer may be lowered into a borehole, for example, by either wireline cable or drill pipe. Because the gamma ray spectrometer energy response calibration may drift, over time and temperature during use thereof in a borehole, a means to maintain the energy response calibration is required. It is known in the art to use a low-activity radioactive source installed in the gamma ray detector to provide a stable energy reference peak that the well logging tool hardware or software can use to correct for any drift in energy response calibration. $Am^{241}$ is typically used as a reference source.

While using an $Am^{241}$ reference source is a fairly straightforward solution of the energy response gain stabilization problem, it may have disadvantages. One is that the reference energy peak for an $Am^{241}$ source is 59.5 KeV, but the energy range of the typical spectrometer is from a few hundred Kev to more than 2.6 Mev. This results in a dynamic range of nearly 45 from the stabilization peak energy to the upper end of the spectrometer operating range. This large dynamic range can make stabilization difficult. Another disadvantage to using an $Am^{241}$ reference source is it may require licensing and special handling aid storage procedures because it is a chemical isotopic radiation source. This increases the administrative costs associated with such type of well logging tool. An alternative to the use of $Am^{241}$ is described in U.S. Pat. No. 5,023,449 issued to Holenka et al., wherein a higher energy peak but extremely low activity $Na^{22}$ source is used in coincidence mode between two detectors to stabilize a pair of detectors. The foregoing described technique may overcome some of the disadvantages of using an $Am^{241}$ source, but requires two detectors located very close together.

SUMMARY

One aspect of the disclosure is a method for gain control of a radiation detector. An example method includes measuring standard gamma ray spectra for known concentrations of selected radioactive materials found in earth formations. A standards matrix is calculated from the standard gamma ray spectra. A singular value decomposition is computed from a matrix related to measurements of gamma ray spectra of formations and the standards matrix. A radiation detector gain is computed from a minimum ratio of null space with respect to data value space of a subsurface formation measurement related matrix and the standards matrix. Gain of the radiation detector is adjusted based on the computed radiation detector gain.

Other aspects and advantages will be apparent from the description and claims which follow.

DETAILED DESCRIPTION

The present description will begin with example systems for acquiring and processing data according to various example techniques. Following will be a description of various example techniques for processing data so acquired. The technique to be described herein eliminates the need to use a radioactive source for gain stabilization. The technique works by numerically comparing the characteristics of energy spectra measured by the gamma ray spectrometer in the logging tool to known shapes of gamma ray spectra from uranium, thorium, and potassium. Spectra measured by the logging tool may be considered a linear combination of the known spectra so the technique may apply in general to radiation spectroscopy borehole logging.

Figure 1:
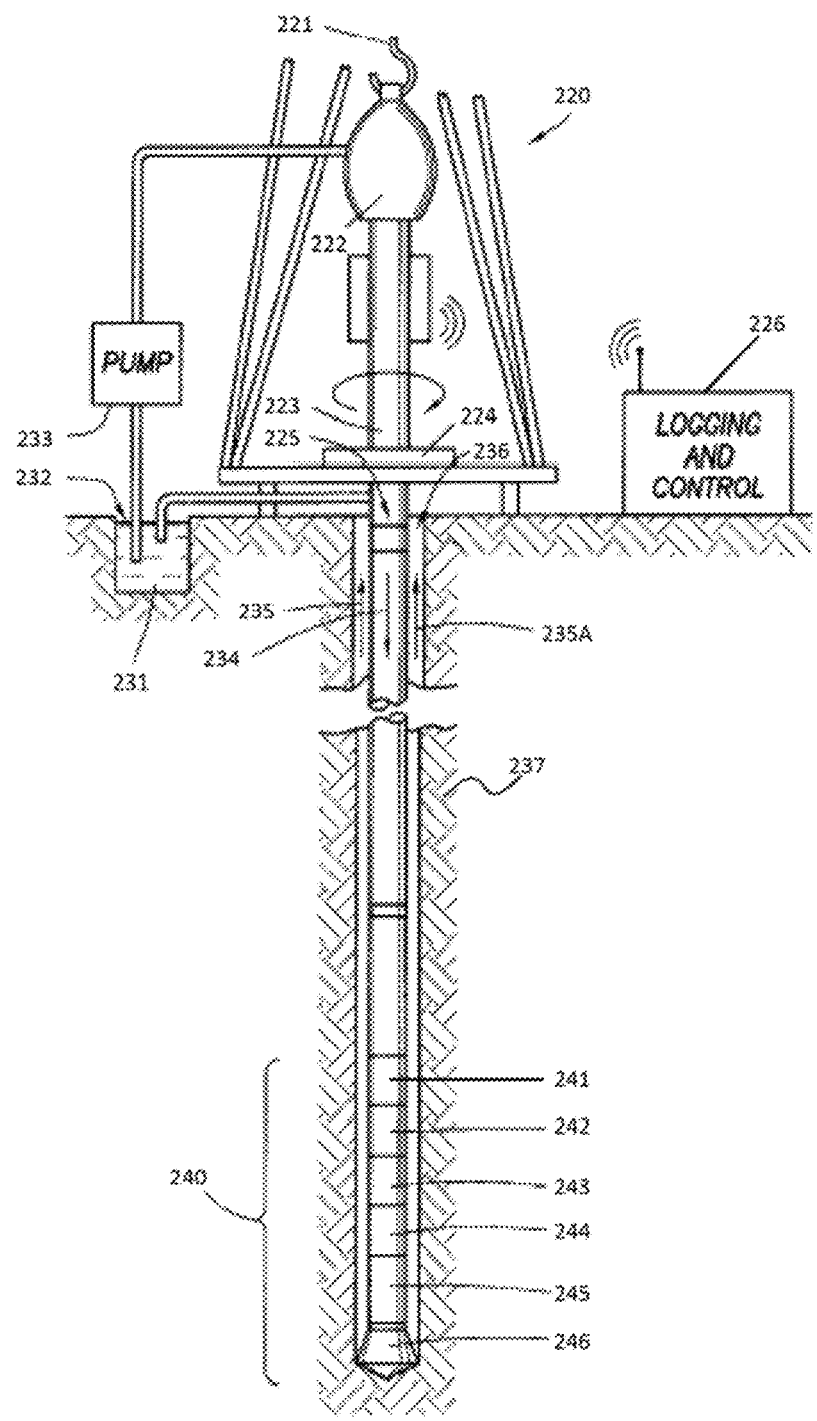
FIG. 1 shows an example wellsite system that may be used to acquire data to be used in various example processing techniques.

The methods or means of conveyance may include any methods or means of conveyance known to those of ordinary skill in the art. FIG. 1 illustrates a wellsite system in which data to be used according to examples of the present disclosure may be used. The wellsite can be onshore or offshore. In this example system, a borehole is formed in subsurface formations by rotary drilling in a manner that is well known.

A drill string 225 is suspended within a borehole 236 and lias a bottom hole assembly (BHA) 240 which includes a drill bit 246 at its lower end. A surface system 220 includes platform and derrick assembly positioned over the borehole 236, the assembly including a rotary table 224, kelly (not shown), hook 221, and rotary swivel 222. The drill string 225 is rotated by the rotary table 224 energized by means not shown, which engages the kelly (not shown) at the upper end of the drill string 225. The drill string 225 is suspended from the hook 221, attached to a traveling block (also not shown), through, the kelly (not shown) and the rotary swivel 222 which permits rotation, of the drill string 225 relative to the hook 221. As is well known, a top drive system could be used instead of the system shown in FIG. 1.

In the illustrated example, the surface system further includes drilling fluid or mud 232 stored in a pit 231 formed at the well site. A pump 233 delivers the drilling fluid to the interior of the drill string 225 via a port (not shown) in the swivel 222, causing the drilling fluid to flow downwardly through, the drill string 225 as indicated by the directional arrow 234. The drilling fluid exits the drill string via ports (not shown) in the drill bit 246, and then circulates upwardly through an annulus region 235 between the outside of the drill string 225 and the wall of the borehole 236, as indicated by the directional arrows 235 and 235A. In this well known manner, the drilling fluid, lubricates the drill bit 246 and carries formation cuttings up to the surface as it is returned to the pit 231 for recirculation.

The BHA 240 of the illustrated embodiment may include a measuring-while-drilling (MWD) tool 24.1, a logging-while-drilling (LWD) tool 244, a rotary steerable directional drilling system 245 and motor, and the drill bit 250. It will also be understood that more than one LWD tool and/or MWD tool can be employed, e.g. as represented at 243.

The LWD tool 244 is housed in a special type of drill collar, as is known in the art, and can contain one or a plurality of known, types of logging tools. The LWD tool may include capabilities for measuring, processing, and storing information, as well as for communicating with the surface equipment. In the present example, the LWD tool 244 may include a scintillation type radiation detector with a multichannel analyzer adapted to fit in the special drill collar. An example scintillation type radiation detector is described in U.S. Pat. No. 5,489,779 issued to Pemper et al. and incorporated herein by reference. Such detectors may include a scintillation material (which may be in crystalline form) optically coupled to a. photomultiplier tube. The scintillation material may be materials, for example and without limitation, such as thallium-doped sodium iodide and gadolinium oxyorthosilicate.

The MWD tool 241 is also housed in a special type of drill collar, as is known in the art, and can contain one or more devices for measuring characteristics of the drill string and drill bit. The MWD tool 241 further includes an apparatus 242 for generating electrical power to the dowmhole system. This may typically include a mud turbine generator powered by the flow of the drilling fluid, it being understood that other power and/or battery systems may be employed. In the present embodiment, the MWD tool 241 may include one or more of the following types of measuring devices: a weight-on-bit measuring device, a torque measuring device, a vibration measuring device, a shock measuring device, a stick slip measuring device, a direction measuring device, and an inclination measuring device. The power generating apparatus 242 may also include a drilling fluid flow modulator for communicating measurement and/or tool condition signals to the surface, for detection and interpretation by a logging and control unit 226.

Figure 2:
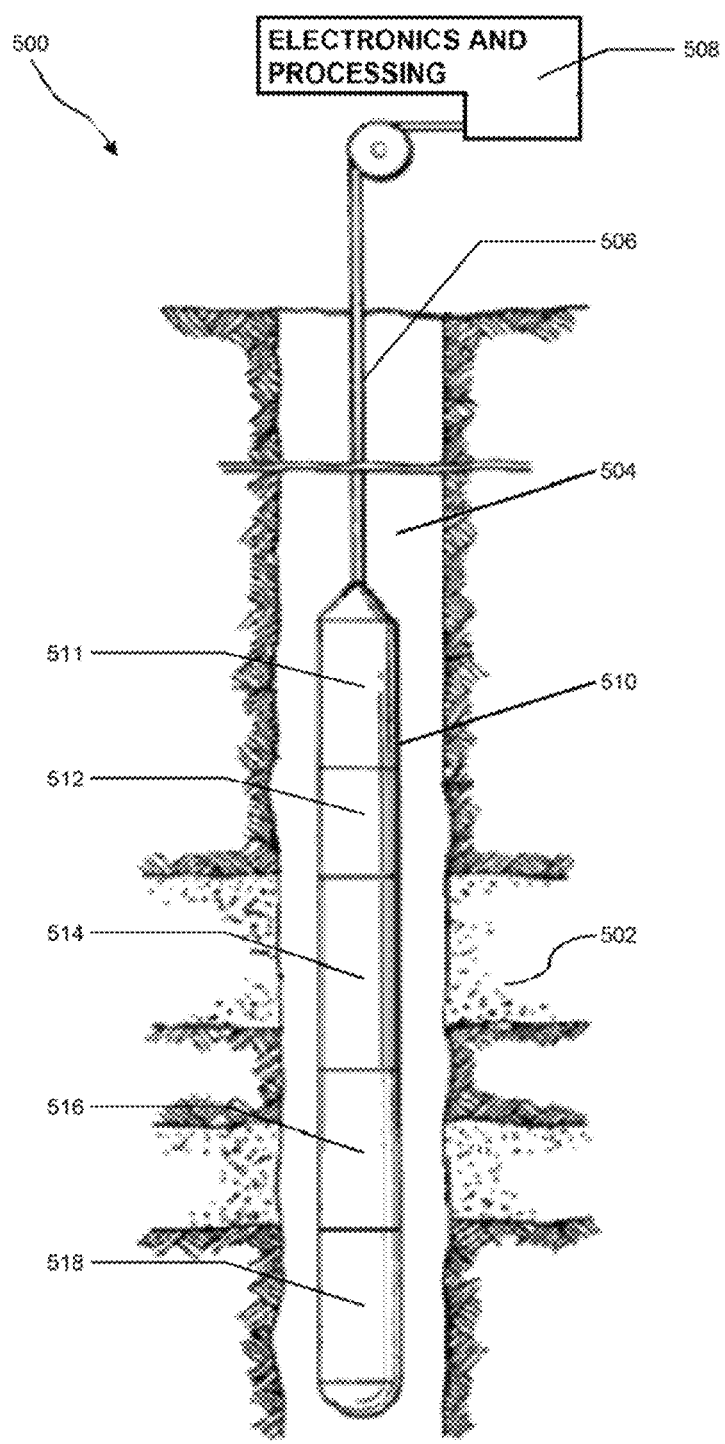
FIG. 2 shows a wireline well logging instrument and acquisition system that may be used to acquire data to be processed by various example techniques.

Referring to FIG. 2, an example wireline tool 510 is shown that may be another environment in which aspects of the present disclosure may be implemented. The example wireline tool 510 is suspended in a wellbore 504 from the lower end of an armored multiconductor cable 506 that is spooled on a winch (not shown) at the Earth's surface. At the surface, the cable 506 is communicatively coupled to an electronics and processing system 508. The example wireline tool 510 includes an elongated body that may include a scintillation type radiation detector with, a multichannel analyzer. Additional components may also be included in the wireline tool 510.

Though FIGS. 1 and 2 illustrate example while-drilling and wireline systems of conveyance, respectively, other systems of conveyance can be used. Examples of other systems of conveyance that can be used with certain aspects described in the foregoing disclosure include coiled tubing, drillpipe, and slickline systems.

Certain aspects or components of the invention can comprise a computer program that embodies the functions described herein and illustrated in the flow charts. The computer (not shown) may be disposed at the surface, e.g., in logging and control unit 226 in FIG. 1 or electronics and processing system 508 in FIG. 2. However, it should be apparent that there could be many different ways of implementing the invention in computer or algorithmic programming, and the invention should not be construed as limited to any one set of program instructions. Further, a skilled programmer would be able to write such a program to implement an embodiment of the disclosed invention based on the flow charts and associated description in the application text. Therefore, disclosure of a particular set of program code instructions is not considered necessary for an adequate understanding of how to make and use the invention.

Figure 3:
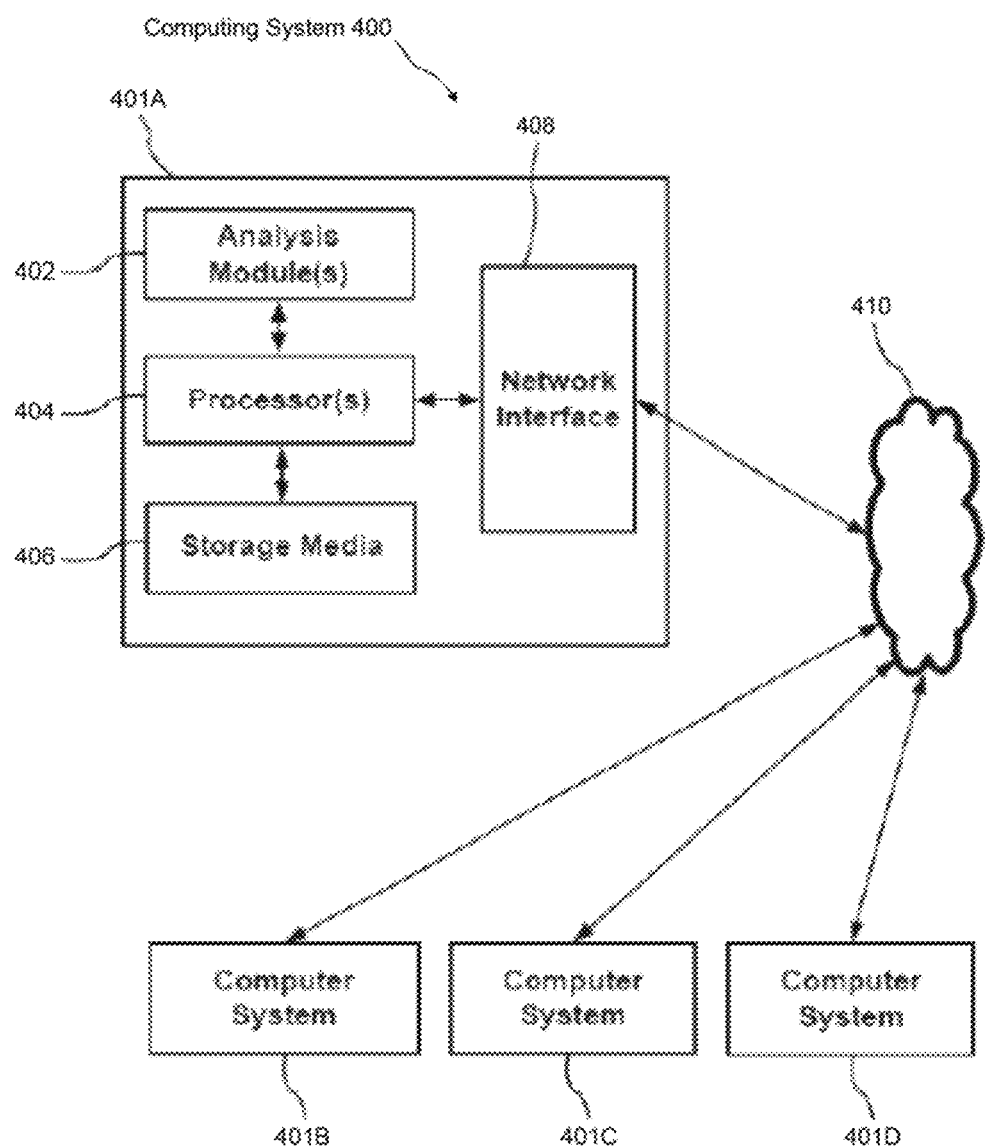
FIG. 3 shows an example computer system that may be used to implement various data processing procedures.

FIG. 3 depicts an example computing system 400 in accordance with some embodiments. The computing system 400 can be an individual computer system 401A or an arrangement of distributed computer systems. The computer system 401A may include one or more analysis modules 402 that are configured to perform various tasks according to some embodiments, such as the tasks depicted in FIG. 4 to be further explained below. To perform these various tasks, analysis module 402 may execute independently, or hi coordination with, one or more processors 404, which may be connected to one or more storage media 406. The processor(s) 404 may also be connected to a network interface 408 to allow the computer system 401A to communicate over a data network. 410 with one or more additional computer systems and/or computing systems, such as 401B, 401C, and/or 401D. Note that computer systems 401B, 401C and/or 401D may or may not share the same architecture as computer system 401A, and may be located in different physical locations, e.g. computer systems 401A and 401B may be at a wellsite (FIGS. 1 and 2), while in communication with one or more computer systems such as 401C and/or 401D that are located in one or more data centers, and/or located in varying countries on different continents.

A processor can include a microprocessor, microcontroller, processor module or subsystem, programmable integrated circuit, programmable gate array, or another control, or computing device.

The storage media 406 may be implemented as one or more computer-readable or machine-readable storage media. Note that while in the example embodiment of FIG. 9 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EE- PROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 400 is only one example of a computing system, and that computing system 400 may have more or fewer components than shown, may combine additional components not depicted in the example embodiment of FIG. 3, and/or computing system 400 may have a different configuration or arrangement of the components depicted in FIG. 3. The various components shown in FIG. 3 may be implemented in hardware, software, or a combination of hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Having explained systems for acquiring (and recording) data, an example procedure will now be explained, specifically with reference to the flow chart in FIG. 4.

Gamma ray spectral measurements made by both laboratory instrument and borehole logging tools known in the art use well known numerical techniques to make fine adjustments to the calibration of measured spectra by minimization of a residual error. This requires computing unknown quantities, such as elemental concentration, by some matrix inversion technique and then re-computing an approximation to the measured spectra using the now known concentration. A residual error can then be computed between the originally measured spectra and the computed approximation to measure how close the two spectra are. A calibration or detector gain adjustment can then be made, and the foregoing process repeated until a minimum in the residual error is found.

While the technique described here in some ways resembles the reduction of a residual it is fundamentally different in that it does not require computation of detector count rate residuals. The technique described herein computes a projection of the measured spectra onto two vector spaces: the data vector space of the measurement and a vector space containing measurement errors. This latter space is usually called the null space for the data. A detector gain or calibration factor may then be calculated to minimize the error projection.

The foregoing process may be encoded in the software of either the downhole tool or the surface processing software (e.g., in the surface units shown in FIGS. 1 and 2), The example process makes a calculation that measures how well current borehole tool measurement match known reference window count rates for thorium, uranium, and potassium used to solve for concentrations of thorium, uranium, and potassium in the formations surrounding the borehole. The process then adjusts the borehole tool's detector gain (or calculates a calibration factor) to minimize mismatch between the known references and the borehole tool measurements. The gain adjustment or calibration can be made, for example, by changing the high voltage applied to the photomultiplier tube, using a digitally controlled attenuator, adjusting the gain of an electronic amplifier, or may applied numerically In converting from a many-bin (bin representing an individual energy level window in the multichannel analyzer) spectrum to a few bin spectrum.

To explain how the process is developed it is helpful to review a process known in the art for determining formation thorium, uranium, and potassium concentrations determined from the borehole tool measurements. One standard technique for determining thorium, uranium, and potassium concentrations requires a calibration measurement of three standard gamma ray spectra: one for thorium; one for uranium; and one for potassium The detector count rates in these spectra are then normalized to unit concentrations. In an optimized tool design these spectra would be determined by electronic circuitry containing many energy bins in the multichannel analyzer, e.g., 256 or more ("many bin spectra"). The many bin spectra may then be reduced or windowed to a fewer number of energy bins, for example, by combining selected numbers of adjacent bins of the many bin spectra. As an example, 256 bin spectra could be reduced to 16 counting windows for simpler handling of the data with very little loss in statistical quality of the calculated results.

After windowing to 16 count rate bins a matrix equation relating an arbitrary combination (C) of thorium, uranium, and potassium to window count rates(W) and standard spectra count rates (S) can be written as:

$$W_{16\times1} = S_{16\times3} * C_{3\times1} \tag{1}$$

A number of standard techniques for exist for solving equation (1), but all involve minimization of an error quantity. A common technique for such minimizations is the minimization of the least square error (LSQ) magnitude.

$$\|(W_{16\times1} - S_{16\times3} * C_{3\times1})\|^2 = \text{error}^2 \tag{2}$$

Solving for the LSQ one may obtain a solution for the thorium, uranium, and potassium concentrations in terms of the window counts and the standards matrix:

$$C = \text{inv}(S^T * S) * S^T * W \tag{3}$$

For gain control or calibration calculation according to the present disclosure it is more important to review the underlying structure of the matrix=$\text{inv}(S^T*S)*S^T$. For purposes of the present example this may be performed by calculating the singular value decomposition (SVD) of the standards matrix $\text{inv}(S^T*S)*S^T$.

The SVD of $\text{inv}(S^T*S)*S^T$ results in the matrix, equation:

$$[VQU] = \text{svd}(\text{inv}(S^T*S)*S^T)$$

And from the known properties of a singular value decomposition we have $$\text{inv}(S^T*S)*S^T = V*Q*U^T \tag{4}$$

In equation (4) U is a 16×16 matrix containing a vector basis set for all possible window count rates W. The first three columns are a basis for window counts W that are a linear combination of the standards and the remaining 13 columns form a null space for W's that are a linear combination of the standards. What this means is that if the measured window counts W have no error resulting from statistics, borehole effects, or gain variation, the 16×1 vector P will have zeros below the third row entry. In the present ease, $P=U^T*W$.

Figure 5:
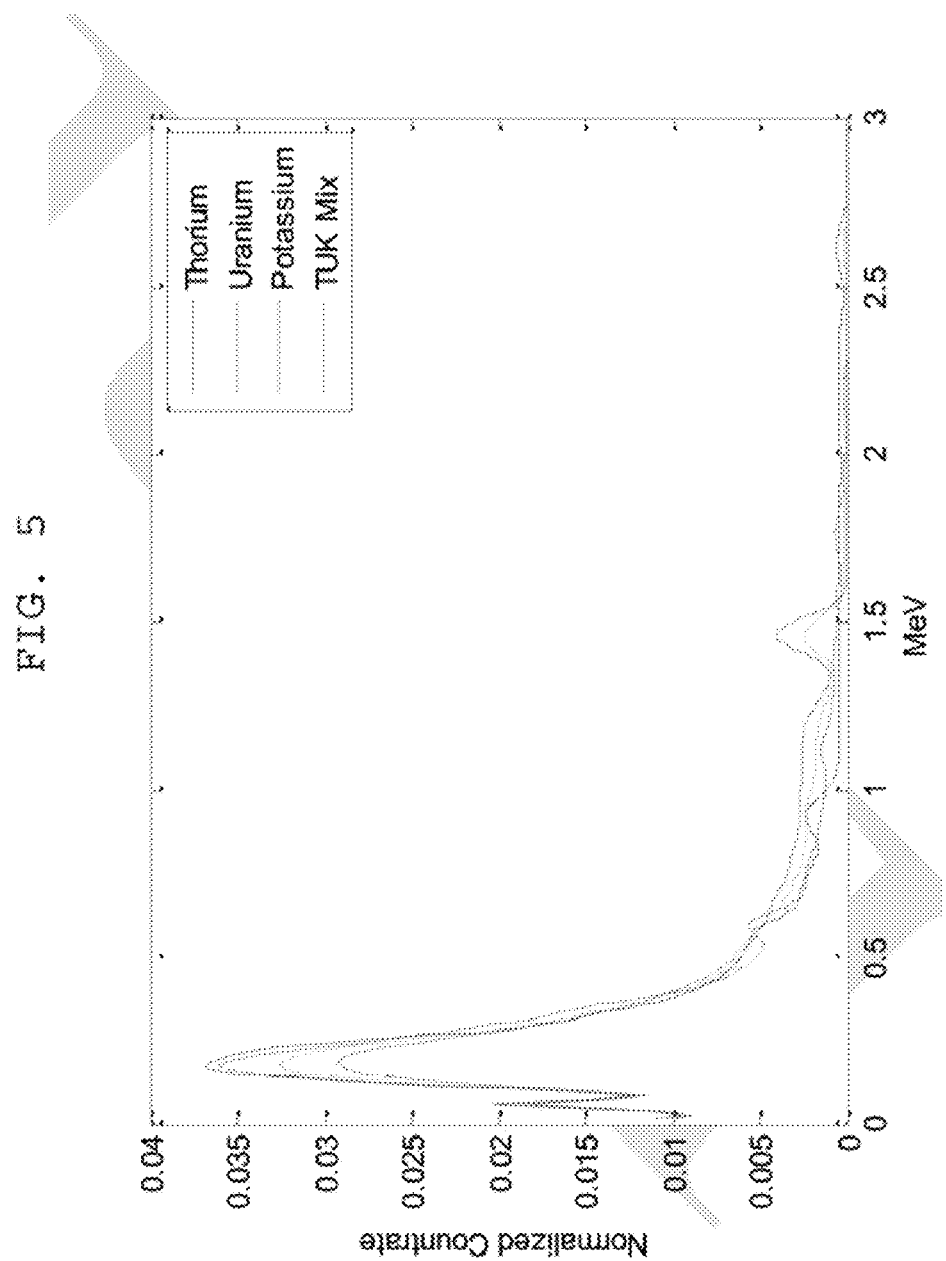
FIG. 5 shows a plot of Monte Carlo simulation to test the effectiveness of the example procedure.

Monte Carlo simulation data was used to determine the effectiveness of the above procedure. In the simulation, spectral data were computed for formations containing only thorium, only uranium, only potassium, and a formation with a mixture of the three. 256 energy bins were used in the simulations. These data are plotted in FIG. 5.

The 256 bin data were reduced to 16 bins or windows starting at an energy of 0.290 Mev. A standards matrix, S, was then formed using the three 16×1 column vectors for thorium, uranium, and potassium. If the LSQ solution is expanded, $inv(S^T*S)*S^T$ using the SVD technique and then multiplying S by $U^T$, one obtains:

$$U^T * S = \begin{bmatrix} -0.0112 & 0.0112 & -0.0010 \\ -0.0188 & -0.0160 & 0.0326 \\ 0.1943 & 0.2136 & 0.2169 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \\ 0.0000 & 0.0000 & 0.0000 \end{bmatrix}$$

As expected all the terms below the third row are zero. Now if this calculation is repeated for the window count rates from the mixture window counts one obtains $$U^T * Mix = \begin{bmatrix} -0.0011 \\ 0.0097 \\ 0.2104 \\ -0.0004 \\ 0.0006 \\ -0.0003 \\ 0.0001 \\ 0.0002 \\ 0.0002 \\ -0.0003 \\ -0.0002 \\ 0.0002 \\ 0.0001 \\ 0.0000 \\ 0.0004 \\ 0.0002 \end{bmatrix}$$

Here one may observe small non zero values below the third row. These non zero terms arise from statistical variations in the Monte Carlo simulation causing some variation from a strict linear combinations of the columns of S.

To see how gain variations influence the data null space values, window counts for the mixture simulation were computed using a range of gains about the true gain of 0.0113MeV/channel (windowed energy bins in the multichannel analyzer bins). The resulting W matrices were then multiplied by $U^T$. To gauge the effect of the gain variations, a sum of squares of the values below the third row of $U^T*W$ was computed and divided by the sum of squares in the first three rows of $U^T*W$. If no gain or calibration error effect exists it may be expected that this ratio be zero and to be large if the gain or calibration factor is far from the true value.

Figure 6:
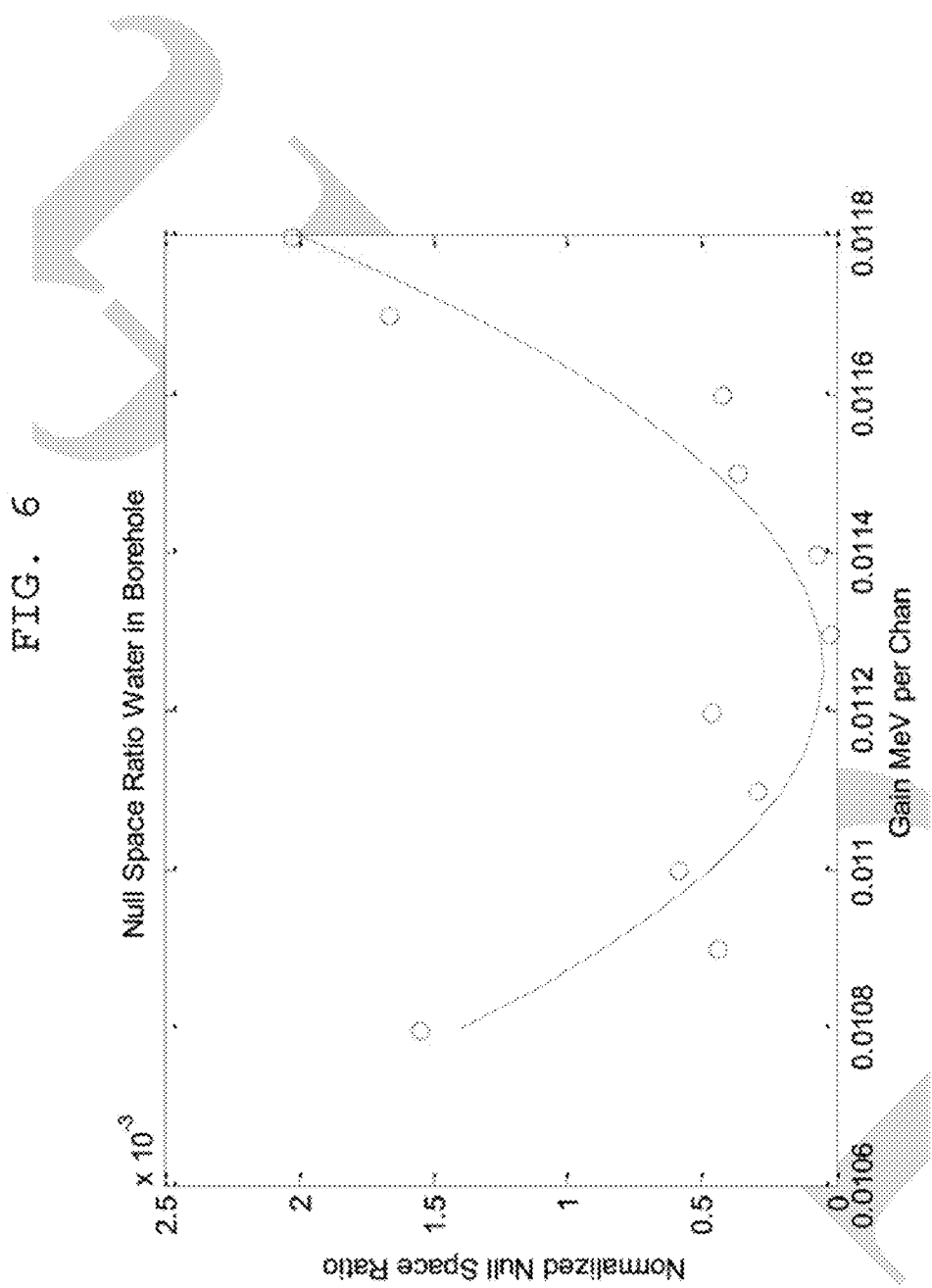
FIG. 6 shows a plot of Monte Carlo simulation of results using a borehole tool in a water filled borehole.

In the FIG. 6 the computed ratios and a second order fit to the ratio data are plotted. In FIG. 6 a clear minimum exists at a gain slight smaller than the correct value 0.0113MeV/channel for the fitted curve. The minimum in the actual data points is at 0.0113MeV/channel as predicted.

What has been shown to this point is that by computing a ratio of the projection of the measured window counts on the window count null space to the window count rate space an accurate gain parameter can be computed under ideal conditions such as in a water filled borehole. This computed parameter can then be used for both adjusting the gain used in computing the few bin window counts from the many bin spectra and as a control parameter to electronically regulate the gain of the detector.

In actual borehole logging environments borehole conditions will, practically never exactly match the borehole conditions of the standard spectra measurements. Typically the standard measurements are measured in boreholes filled with water, but a variety of borehole fluids are encountered in actual borehole logging. As the atomic number and density of the borehole fluid increases, the count rates at lower energies of the spectrum will be reduced and thus distort the spectrum. It is possible to reduce low energy spectral distortion, for example, by wrapping the detector with a thin, sheet of high atomic number material such as tantalum and by using a high starting energy bin for the windowing process.

Figure 7:
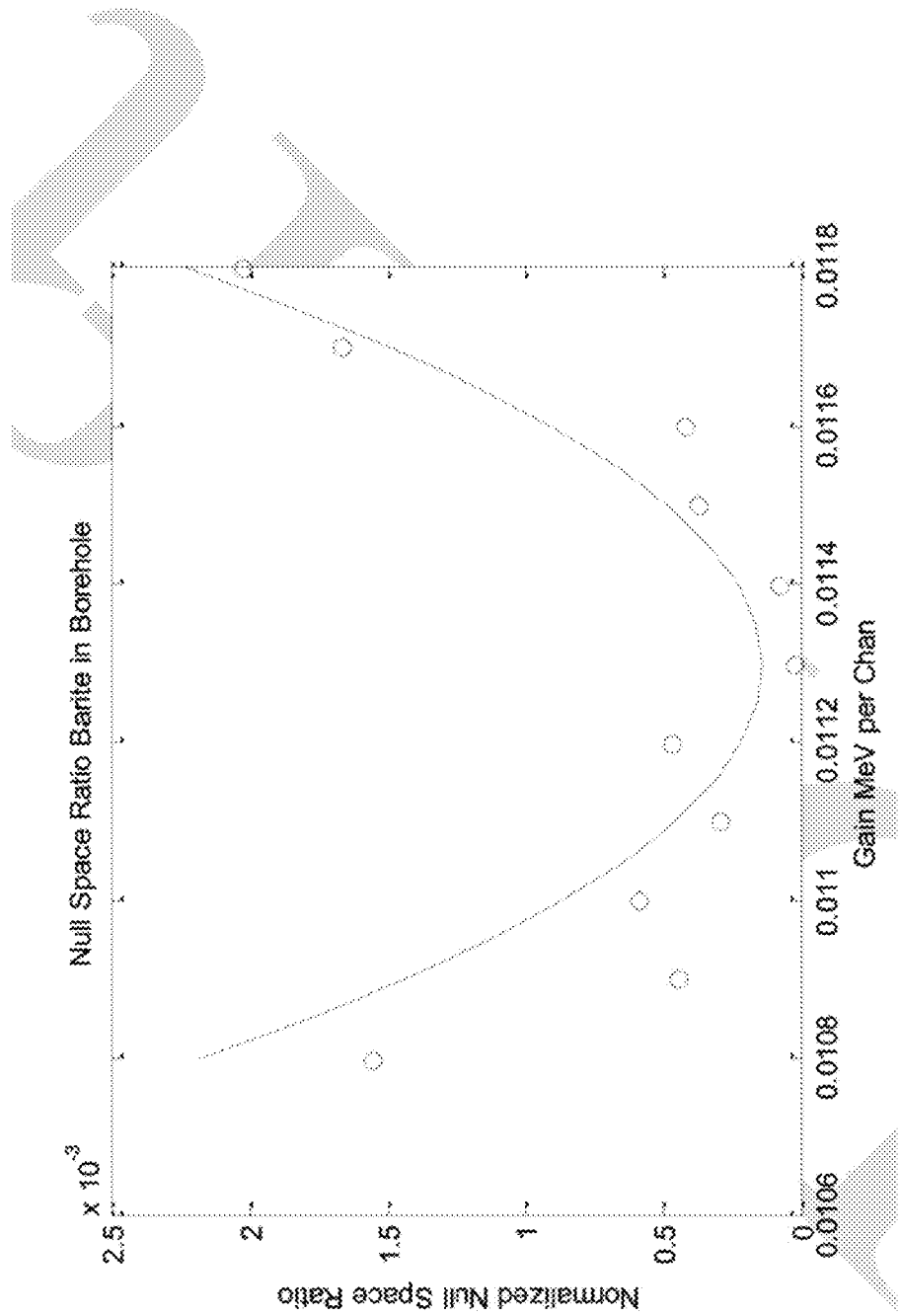
FIG. 7 shows a plot of Monte Carlo simulation of results using a borehole tool in a borehole filled with barite weighted drilling mud.

To explore the effects of reducing sensitivity to borehole effects, Monte Carlo simulations were performed to simulate the scintillation detector wrapped with a 0.5 mm sheet of tantalum. In these simulations water in the borehole was replace by 1.6 pound per gallon (ppg) density drilling mud wherein the density increasing material was barite (barium sulfate). FIG. 7 shows results for the borehole filled with 16 ppg barite weighted mud In this case the gain is predicted to be 0.013 MeV/chan both the fitted curve and the actual data points.

From FIGS. 6 and 7 it may be concludes the technique can be made relatively insensitive to the borehole environment by wrapping the scintillation detector with a high atomic number material and selecting an appropriate lower energy bound for windows.

In the example given above the gain stabilization was based on making a singular value decomposition of the matrix obtained from a specific numerical technique, LSQ, for solution of the response equation 1. It is not necessary to make any assumption regarding a specific numerical technique for the gain stabilization to work. If one starts again with equation 1 relating window counts to the formation concentrations of thorium, uranium, and potassium the result may be written as;

$$W_{16\times1} = S_{16\times3} * C_{3\times1} \tag{5}$$

As in the previous example determining the singular value decomposition of S results in 3 matrices V, Q, and U.

$$[VQU] = SVD(S) \tag{6}$$

Note that in this case the singular value decomposition of S is directly applied, not the its inverse determined by the LSQ process.

In this case V is a 16×16 matrix whose rows form a vector basis set for all possible 16×1 window counts. $V^T*V$ is the identity matrix I. Again the key property of interest is in the first 3 rows of $V^T$. These 3 rows form a basis set for all the possible zero error window counts W. The sub-space spanned by these 3 rows may be called the data space. Multiplying any row of $V^T$ after the first 3 rows will provide the result of zero, hence the rows 4 to 13 represent what may be called the null space of the measurement matrix W.

If one obtains a measurement vector W with a gain error, e.g., in a well logging instrument disposed in a wellbore, in a vector sense part of W will lie in the data space spanned by the first 3 rows, and part of W will be in in the null space spanned by the other 13 rows. It is possible to correct gain (and even offset) errors in the measured spectrum by:

adjusting the gain of the many bin spectrum:

collapsing the many bin spectrum to a selected dimension (n) of W (e.g., 16);

take the product $V^T*W$ to obtain a W dimension ×1 vector;

summing the squares of rows 4 to n of $V^T*W$ to get a projection of the measurement on the null space;

sum the squares of the first 3 rows of $V^T*W$ to get the projection of the measurement on the data space; and when the adjusted gain matches the gain used to establish S the null space projection will be small or zero and the data space projection will be maximum. Then search for the gain value which provides a minimum in the ratio:

(Null Space Projection)/(Data Space Projection)

One than can correct the measured value vector W's gain back to the gain of the original S measurements without knowledge of the specific technique used for solving equation 1.

As the adjusted gain approach the gain of the calibration window measurements the projection on the null space approaches zero and the projection on the data space is maximized.

The U matrix is given by the SVD hi the above example 16 window case and 3 unknown concentrations of thorium, uranium, and potassium, and vector U has dimensions 3×3. It has properties identical to V, but is 3×3 and spans the space representing all possible TUK vectors.

The Q matrix in the present 16 window example is 16×3 and contains the singular or eigenvalues of the S matrix as its diagonal elements in descending order.

The well logging tool is normally calibrated with a small, portable gamma ray source and a gain us established for tool initialization. This initial gain is communicated to the null projection program. As the tool descends in the well, the tool temperature will change according to the well temperature and affect the detector gain. This gain change may be partially compensated by a control loop varying the high voltage applied to the gamma ray detector's photomultiplier tube based on the tool temperature. The gain computed by "null projection" can also be conducted to the control loop to maintain a fine control over the gain.

Figure 4:
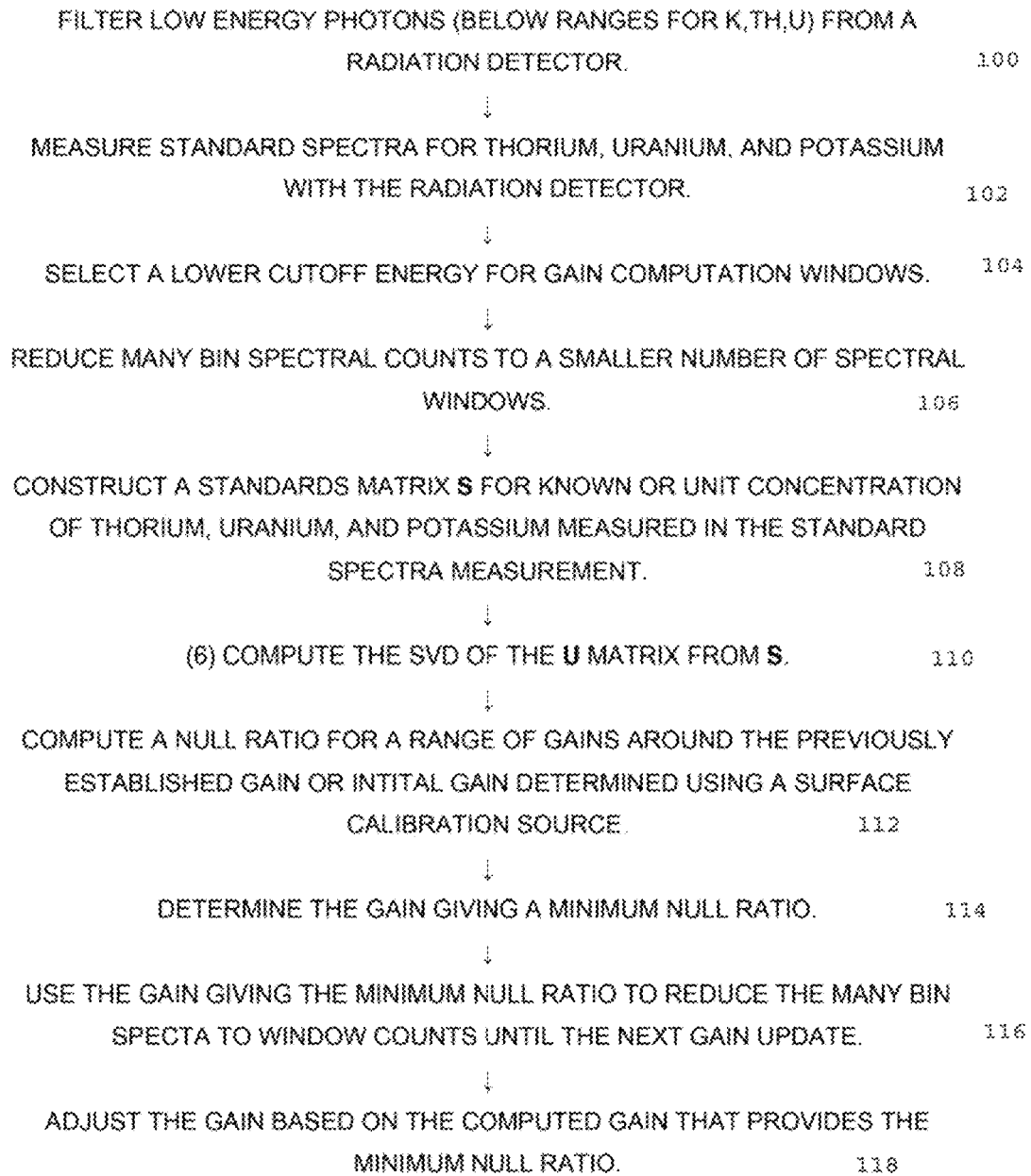
FIG. 4 shows a flow chart of an example data processing procedure.

In practice, and with reference to the flow chart in FIG. 4, the present example technique may include:

(1) selecting a material such as tantalum for wrapping the detector to filter low-energy photons as shown at 100;

(2) measuring standard spectra for thorium, uranium, and potassium with the borehole logging tool as shown at 102;

(3) selecting a lower cutoff energy for gain computation windows as shown at 104;

(4) reducing the many bin spectral counts to a smaller number windows, for example, 16, by merging adjacent bins as shown at 106;

(5) constructing the standards matrix S for known or unit concentration of thorium, uranium, and potassium as shown at 108; and (6) compute the SVD of the U or V matrix from S as shown at either 56 or 41.

For calculation of gain control or calibration during borehole logging the following would be performed:

(1) compute the null ratio for a range of gains around the previously established gain or initially established gain (such as by using a portable calibration source) as shown at 112;

(2) determine the gain giving a minimum null ratio as shown at 114;

(3) Use the gain determined in (2) above to reduce many bin spectra to window counts until the next gain update as shown at 116;

(4) adjust the gain based on the computed gain from (3) above as shown at 118.

From the above description it can be observed that the present technique may work better if a rough estimate of the gain is a priori known, e.g., by using a calibration source at the surface. In typical well logging environments, temperature variations may be the principle cause of gain changes. A temperature input to the gain control algorithm can be used to roughly control the gain, and the null ratio as determined above used to precisely compute gain as described above What has been described herein is a technique that may precisely compute the correct gamma ray spectrometer gain for conversion to window counts independent of the borehole environment and the numerical technique applied to solve equation 1. This may eliminate the need for a radioactive gain stabilization source within the radiation detector itself.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for gain control of a radiation detector, comprising:

measuring standard gamma ray spectra for known concentrations of selected radioactive materials found in earth formations;

in a computer, constructing a standards matrix from the standard gamma ray spectra;

in a computer, computing a singular value decomposition from a matrix related to measurements of gamma ray spectra of formations having unknown concentrations of the selected radioactive materials and the standards matrix;

in a computer, determining a radiation detector gain from a minimum ratio of null space with respect to data value space of the unknown concentration formation measurement related matrix and the standards matrix; and adjusting a gain of the radiation detector based on the computer radiation detector gain without using a radioactive reference source in the radiation detector.

2. The method of claim 1 further comprising shielding the radiation detector from photons having energy below a selected value.

3. The method of claim 1 further comprising reducing a number of energy levels for computation of the matrices by combining measurements of adjacent energy level bins in a multichannel analyzer coupled to the radiation detector.

4. The method of claim 1 further comprising initializing a gain of the radiation detector using a radioactive source before deploying the radiation detector in a borehole.

5. The method of claim 1 further comprising:
computing the singular value decomposition on different formation measurements;
repeating the determining gain; and
repeating the adjusting the gain as the radiation detector is moved along a borehole.

6. The method of claim 1 wherein the radiation detector comprises a scintillation material optically coupled to a photomultiplier.

7. The method of claim 6 wherein the scintillation material comprises at least one of thallium doped sodium iodide and gadolinium oxyorthosilicate.

8. The method of claim 6 wherein energy levels of gamma rays detected by the radiation detector are determined by a multichannel analyzer.

9. The method of claim 1 wherein the selected radioactive materials comprise potassium, thorium and uranium.

10. A method for gain control of a radiation detector, comprising:
measuring standard gamma ray spectra for known concentrations of selected radioactive materials found in subsurface formations using a gamma ray spectrometer instrument configured for moving within a borehole;
moving the radiation detector without a radioactive source within a borehole, making measurements of radiation emanating from formations adjacent the borehole;
in a computer, constructing a standards matrix from the standard gamma ray spectra;
in a computer, computing a singular value decomposition from a matrix related to the borehole radiation measurements;
in a computer, determining a radiation detector gain from a minimum ratio of null space with respect to data value space of borehole formation measurement related matrix and the standards matrix; and
adjusting a gain of the radiation detector based on the computed radiation detector gain.

11. The method of claim 10 further comprising shielding the radiation detector from photons having energy below a selected value.

12. The method of claim 11 wherein the shielding the radiation detector comprises covering the radiation detector with a high atomic number material shield.

13. The method of claim 12 wherein the high atomic number material comprises tantalum.

14. The method of claim 10 further comprising reducing a number of energy levels for computation of the matrices by combining measurements of adjacent energy level bins in a multichannel analyzer coupled to the radiation detector.

15. The method of claim 10 further comprising initializing a gain of the radiation detector using a radioactive source before deploying the radiation detector in a borehole.

16. The method of claim 10 further comprising:
repeating the measurement of different formations;
repeating the computing the singular value decomposition;
repeating the determining gain; and
repeating the adjusting the gain as the radiation detector is moved along a borehole.

17. The method of claim 10 wherein the radiation detector comprises a scintillation material optically coupled to a photomultiplier.

18. The method of claim 17 wherein the scintillation material comprises at least one of thallium doped sodium iodide and gadolinium oxyorthosilicate.

19. The method of claim 10 wherein energy levels of gamma rays detected by the radiation detector are determined by a multichannel analyzer.

20. The method of claim 10 further comprising initializing a gain of the radiation detector using a radioactive source before deploying the radiation detector in a borehole.

* * * * *